US011491771B2

(12) United States Patent
Hodzic et al.

(10) Patent No.: US 11,491,771 B2
(45) Date of Patent: Nov. 8, 2022

(54) METHOD OF MANUFACTURING A COMPOSITE PART

(71) Applicant: USA as represented by the Secretary of the Army, Washington, DC (US)

(72) Inventors: Alma Hodzic, Sheffield (GB); Patrick James Smith, Chinley (GB)

( * ) Notice: Subject to any disclaimer, the term of this patent is extended or adjusted under 35 U.S.C. 154(b) by 471 days.

(21) Appl. No.: 16/737,523

(22) Filed: Jan. 8, 2020

(65) Prior Publication Data

US 2020/0189257 A1 Jun. 18, 2020

Related U.S. Application Data

(62) Division of application No. 14/904,368, filed as application No. PCT/GB2014/052043 on Jul. 4, 2014, now Pat. No. 10,618,262.

(51) Int. Cl.

| *B32B 3/00* | (2006.01) |
|---|---|
| *B32B 5/00* | (2006.01) |
| *B32B 7/00* | (2019.01) |
| *B32B 27/00* | (2006.01) |
| *B32B 37/00* | (2006.01) |
| *B29C 37/00* | (2006.01) |
| *B29C 70/00* | (2006.01) |
| *B32B 3/10* | (2006.01) |
| *B32B 27/28* | (2006.01) |
| *B32B 27/34* | (2006.01) |
| *B29C 70/42* | (2006.01) |
| *B29C 70/40* | (2006.01) |
| *B29C 70/34* | (2006.01) |
| *B29C 70/30* | (2006.01) |
| *B29C 70/88* | (2006.01) |
| *B32B 7/12* | (2006.01) |
| *B32B 27/36* | (2006.01) |
| *B32B 27/38* | (2006.01) |
| *B32B 37/12* | (2006.01) |
| *B29K 33/00* | (2006.01) |
| *B29K 63/00* | (2006.01) |
| *B29K 71/00* | (2006.01) |
| *B29K 105/00* | (2006.01) |
| *B29K 105/12* | (2006.01) |
| *B29K 307/04* | (2006.01) |
| *B29L 9/00* | (2006.01) |

(52) U.S. Cl.
CPC ...... *B32B 37/0076* (2013.01); *B29C 37/0025* (2013.01); *B29C 70/30* (2013.01); *B29C 70/34* (2013.01); *B29C 70/40* (2013.01); *B29C 70/42* (2013.01); *B29C 70/88* (2013.01); *B32B 3/10* (2013.01); *B32B 5/00* (2013.01); *B32B 7/12* (2013.01); *B32B 27/28* (2013.01); *B32B 27/285* (2013.01); *B32B 27/34* (2013.01); *B32B 27/36* (2013.01); *B32B 27/38* (2013.01); *B32B 37/1292* (2013.01); *B29K 2033/12* (2013.01); *B29K 2063/00* (2013.01); *B29K 2071/02* (2013.01); *B29K 2105/0073* (2013.01); *B29K 2105/12* (2013.01); *B29K 2105/253* (2013.01); *B29K 2307/04* (2013.01); *B29L 2009/00* (2013.01); *B32B 2255/10* (2013.01); *B32B 2255/26* (2013.01); *B32B 2260/023* (2013.01); *B32B 2260/046* (2013.01); *B32B 2262/02* (2013.01); *B32B 2262/0261* (2013.01); *B32B 2262/065* (2013.01); *B32B 2262/067* (2013.01); *B32B 2262/10* (2013.01); *B32B 2262/101* (2013.01); *B32B 2262/106* (2013.01); *B32B 2305/076* (2013.01); *B32B 2307/50* (2013.01); *B32B 2307/542* (2013.01); *B32B 2307/546* (2013.01); *B32B 2307/762* (2013.01); *B32B 2605/18* (2013.01)

(58) Field of Classification Search
CPC .... B32B 3/00; B32B 5/00; B32B 7/00; B32B 7/10; B32B 7/12; B32B 27/00; B32B 27/20; B32B 27/28; B32B 27/285; B32B 27/30; B32B 27/34; B32B 27/36; B32B 27/38; B32B 37/00; B32B 37/007; B32B 37/0076; B32B 37/10; B32B 37/12; B32B 37/129; B32B 37/1292; B29C 37/00; B29C 37/002; B29C 37/0025; B29C 70/00; B29C 70/30; B29C 70/34; B29C 70/40; B29C 70/42; B29C 70/80; B29C 70/88

See application file for complete search history.

(56) References Cited

U.S. PATENT DOCUMENTS

| 5,104,727 A * | 4/1992 | Wnenchak | ............ B60R 21/235 |
|---|---|---|---|
| | | | 442/268 |
| 2012/0024138 A1* | 2/2012 | Carberry | ............... F41H 5/0421 |
| | | | 89/917 |

* cited by examiner

*Primary Examiner* — Jacob T Minskey
*Assistant Examiner* — Matthew Hoover

(57) ABSTRACT

A method of fabricating a composite material, the method comprises the steps of a) providing a first layer of a fibre reinforced polymer, preferably a thermoset FRP, b) providing an array of thermoplastic islands across at least a proportion of a major surface of the first layer, c) providing a second layer of a fibre reinforced polymer, preferably a thermoset FRP, d) laying the second layer over at least some of the islands, and e) securing the first and second layers together. There is also disclosed a composite which comprises a first layer of a fibre reinforced polymer and a second layer of a fibre reinforced polymer, between which is an intervening layer comprising an array of thermoplastic islands.

6 Claims, 12 Drawing Sheets

Stiffness = Δy / Δx

METHOD OF MANUFACTURING A COMPOSITE PART

This invention relates to a composite and a method of producing a composite. In particular, the invention relates to composites which show beneficial properties.

In particular, although not exclusively, this invention relates to a toughened, preferably self-healing composite and a method of producing a toughened self-healing composite. Advantageously, although not exclusively, the invention relates to composites which show beneficial properties without introducing additional weight (more than 1%) by laying down, e.g. printing, additives between composite plies Composite materials are becoming ever more valuable and are being used in increasing volumes. For example, as well as the well-known use in Boeing's 787 and Airbus' A350 aircraft, composites are increasingly used for structural projects, such as railway bridges and so on. As the general acceptance of composite materials increases the uses to which they are put, and the concomitant demands thereon will likely increase.

One of the major issues with composite materials is the ability to detect damage in situ. Another is repair of composite materials parts once damage has been detected. There is clearly a desire to have stronger (for example stiffer and/or more resistant to interlaminar shear forces) materials. There is a further desire to have stronger (e.g. stiffer and/or more resistant to interlaminar shear forces) materials which are not substantially heavier than those they replace.

It is an object of the current invention to provide a new composite material which is able to satisfy one or more of the above criteria.

A first aspect of the invention provides a composite material comprising a first and second layer and an intervening layer, the first and second layer comprises a fibre reinforced polymer, the intervening layer comprises an array of islands of thermoplastic polymer.

Preferably, the fibre reinforced polymer (FRP) is a thermoset FRP.

In a further aspect of the invention, there is provided a composite material comprising a first and second layer and a thermoplastic material, the first and second layer comprises a thermoset fibre reinforced polymer, the thermoplastic material is discontinuously distributed at and/or towards the interface between the first and second layer.

Preferably, the discontinuous distribution is in the form of an array of islands or zones, for example islands or zones of peak local concentration.

The discontinuous distribution may extend over some or al of or towards the interface, and/or may be localised in certain defined regions. Additionally or alternatively, the density of thermoplastic material may alter across the substrate.

One or more or all of the islands, or each island, may comprise more than one thermoplastic polymer and/or may comprise a copolymer.

The first and second layer may be formed from the same or different thermoset polymers and/or may comprise the same or different fibres.

The thermoset polymers may comprise an epoxy, polyesters, vinyl esters, phenolic resins and any other cross-linked thermosetting polymer.

The fibres may be selected from one or more of carbon fibres, aramid fibres, glass and glass ceramic fibres, plastics fibres (e.g. Nylon, Terylene), hemp, wood and/or other organic fibres, inorganic fibres. The fibres may be provided as continuous and/or discontinuous fibres. The fibres may comprise aligned filaments or tows, or as a braided, knitted or woven mat or sheet. Continuous fibres may be provided as a three-dimensional or two-dimensional structure within the first and/or second layer.

Preferably, the volume fraction of fibre-to-polymer is from 0.01 to 5%, most preferably from 0.05 to 1% In a preferred embodiment the first and second layer comprises a carbon fibre reinforced thermoset polymer, preferably an epoxy polymer.

The islands may comprise one or more thermoplastic polymers. For example, a first array of islands and a second array of islands, each of the first and second arrays being formed of different thermoplastics materials. Further arrays may be provided. The arrays may be regular or irregular.

The thermoplastic polymer may have a melting point of 50 to 200° C., preferably 75 to 190° C., most preferably 100 to 180° C. The molecular weight of the thermoplastic polymer is preferably in the range of 3000 to 50000, preferably 4000 to 40000 (measured as the number average molecular weight). The thermoplastic material may be applied as a solution of thermoplastic material in a solvent. The thermoplastic material may be provided as a solution of up to 50 wt/wt % thermoplastic material, for example up to 45, 40, 35, 30, 25 wt/wt % and preferably more than 1 wt/wt %, for example from 1 to 25 wt/wt %, and most preferably from 4 to 21 wt/wt %.

The thermoplastic polymer may be selected from poly (ethylene glycol) (PEG), poly(methyl methacrylate) (PMMA) and similar thermoplastic polymers, preferably poly(ethylene glycol) and poly(methyl methacrylate).

The islands preferably extend over 20-80% of the area of the first layer, preferably 40-60%.

Preferably each of the islands each have an area of less than 1 mm$^2$, preferably less than 0.5 mm$^2$, for example, less than 0.4, 0.3, 0.2, 0.1 mm$^2$.

Most preferably, the islands are formed in a regular array, for example in columns and rows, or an array aligned along the nominal vertices of polyhedra, for example hexagons, pentagons or other tessellating shapes.

The composite may comprise a further intervening layer comprising an array of islands of thermoplastic polymer provided on the second layer. There may be provided a third layer comprising a fibre reinforced polymer, preferably a thermoset FRP, overlying the further intervening layer. There may be one or more successive intervening layers and fibre reinforced polymer layers.

A further aspect of the invention provides a method of fabricating a composite material, the method comprising the steps of
  a) providing a first layerof a fibre reinforced polymer, preferably a thermoset FRP,
  b) providing an array of thermoplastic islands across at least a proportion of a major surface of the first layer,
  c) providing a second layer of a fibre reinforced polymer, preferably a thermoset FRP,
  d) laying the second layer over at least some of the islands, and
  e) securing the first and second layers together.

The first and second layers may be secured together by the application of heat and/or pressure.

The fibres may be may be selected from one or more of carbon fibres, aramid fibres, glass fibres, plastics fibres (e.g. Nylon, Terylene), hemp, wood and/or other organic fibres, inorganic fibres. The fibres may be provided as continuous and/or discontinuous fibres. The fibres may comprise aligned filaments or tows, or as a braided, knitted or woven mat or sheet. Continuous fibres may be provided as a three-dimensional or two-dimensional structure within the first and/or second layer.

The thermoset polymers may comprise an epoxy, polyesters, vinyl esters, phenolic resins and the like.

Heat may be used to secure the two layers together.

Preferably, the first and second layers comprise a prepreg, for example a carbon fibre reinforced prepreg, preferably an epoxy matrix. In which case, the application of heat will continue the curing process of the prepreg polymer and will cause the first and second layer to become secured together.

Other methods of securing the two layers are also envisaged, including resin injection (e.g. RTM and/or VARTM), adhesives and so on.

The thermoplastic islands may be applied as a solution of thermoplastic in a solvent. The thermoplastic may be present at 1 to 50 w/w % of solution, say from 1 to 45 or 40 w/w %, most preferably from 2 to 40 w/w %, say 3 to 30 w/w %.

The solvent may be non-polar or polar. Polar solvents may be protic or aprotic. The solvent will, in part, depend upon the thermoplastic to be dissolved. Suitable solvents may include water, $C_2$-$C_8$ primary, secondary or tertiary alcohols (for example ethanol), N, N-Dimethylformamide.

The thermoplastic polymer may have a melting point of 50 to 200° C., preferably 75 to 190° C., most preferably 100 to 180° C. The molecular weight of the thermoplastic polymer is preferably in the range of 3,000 to 50,000, preferably 4,000 to 40,000 (measured as the number average molecular weight, $M_n$).

The thermoplastic polymer may be selected from poly (ethylene glycol), poly(methyl methacrylate) and like polymers, preferably poly(ethylene glycol) and poly(methyl methacrylate).

The islands preferably extend over 20-80% of the area of the first layer, ideally 40-60%.

Preferably each of the islands will be laid down with an area of less than 1 mm$^2$, preferably less than 0.5 mm$^2$, for example, less than 0.4, 0.3, 0.2, 0.1 mm$^2$.

The islands may be laid down by an application method, for example using ink jet printing, contact printing and non-contact printing or by use of a mask and spray method. Alternatively, the islands may be laid down as a continuous layer and parts thereof removed (by physical or chemical means) to provide the required array. Physical means may include abrasion, application of heat and so on and chemical means may include dissolution. For ease of manufacture, application methods are preferred, with ink jet printing being particularly preferred.

Clearly the application of heat will cause the solvent to evaporate. However, we believe that evaporation of the solvent will not cause a substantial reduction in the size of the islands (and hence area covered), but rather a volume reduction in the island.

The islands may comprise one or more thermoplastic polymers. For example a first array of islands and a second array of islands, each of the first and second arrays being formed of different thermoplastics materials. Further arrays may be provided. The arrays may be regular or irregular.

Most preferably, the islands are formed in a regular array, for example in columns and rows, or an array aligned along the nominal vertices of polyhedra, for example hexagons, pentagons or other tessellating shapes.

The method may further comprise repeating steps b) to e) to form successive layers of the composite material.

Whilst we do not intend to be bound by any particular theory, we postulate that the provision of the intervening thermoplastic layer(s) improves the self-healing properties of the composite material, e.g., after heat application. Further, we believe that providing a patterned array of thermoplastic material allows the preceding and succeeding layer to form intimate bonds which reduces the likelihood of delamination due to shear forces. The balance of the provision of sufficient thermoplastic to encourage or allow self-healing whilst ensuring the physical coherence of the structure is particularly attractive. Moreover, we believe that the deployment of direct lay down methods (e.g. ink jet printing) is particularly advantageous in terms of manufacturing flexibility and scale up. Finally, this method enables advantageous increase in disparate mechanical properties such as stiffness and toughness of the system, without introducing an additional weight, rendering it very desirable for transport systems and any products that use power for motion.

A further aspect of the invention provides a composite, preferable a self-healing composite, the composite comprising a first layer of fibre reinforced thermoset polymer and a second layer of fibre reinforced thermoset polymer and a thermoplastic polymer distributed at and/or towards the interface there between, the composite being stiffer than an equivalent fibre reinforced thermoset polymer composite absent the thermoplastic polymer.

A yet further aspect of the invention provides a composite, preferable a self-healing composite, the composite comprising a first layer of fibre reinforced thermoset polymer and a second layer of fibre reinforced thermoset polymer and a thermoplastic polymer distributed at and/or towards the interface there between, the composite having improved stiffness and/or interlaminar shear strength.

The thermoplastic polymer may be discontinuously distributed at and/or towards the interface between the first and second layer. The thermoplastic polymer may be preferentially distributed at or towards the interface such that relative concentration of thermoplastic polymer is at a peak at or towards the interface.

Preferably, the discontinuous distribution is in the form of an array of islands or zones, for example islands or zones of peak local concentration.

In this specification, the term "improved stiffness and/or interlaminar shear strength" means that the composite material has an increase in one or other (or both) of the property of stiffness or interlaminar shear strength, when compared with an equivalent structure which is absent the appropriately distributed thermoplastic polymer.

The composite will be substantially the same weight as a corresponding composite absent the thermoplastic polymer.

In order that the invention may be more fully understood, it shall now be described, by way of example only, with reference to the accompanying examples and drawings, in which.

Figure 13:
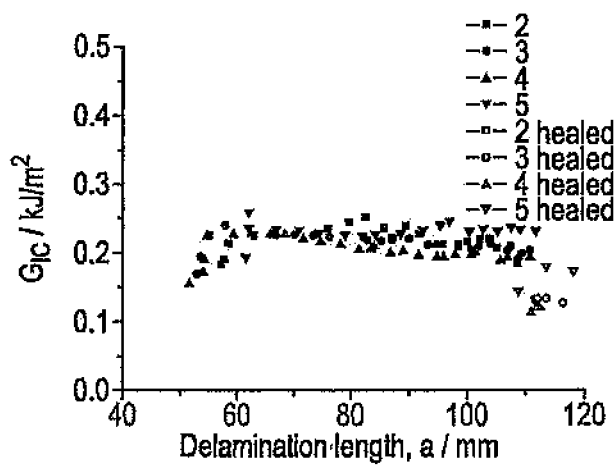
Figure 14:
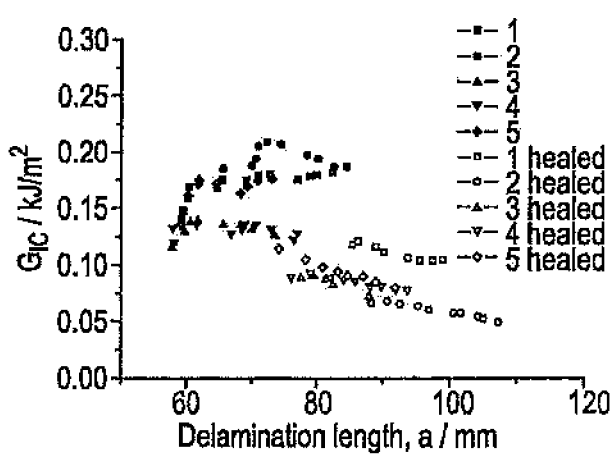
Figure 15:
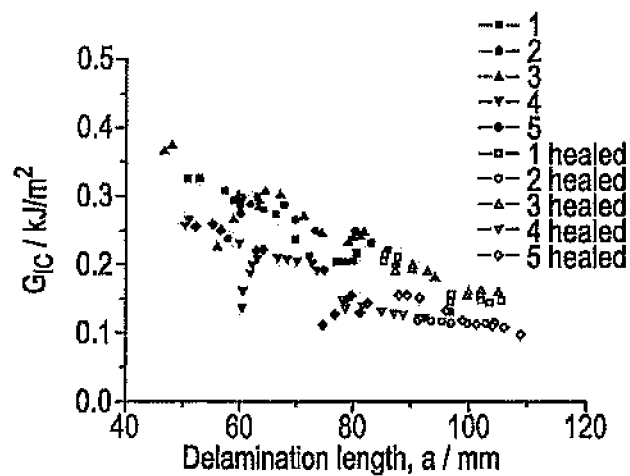
Figure 16:
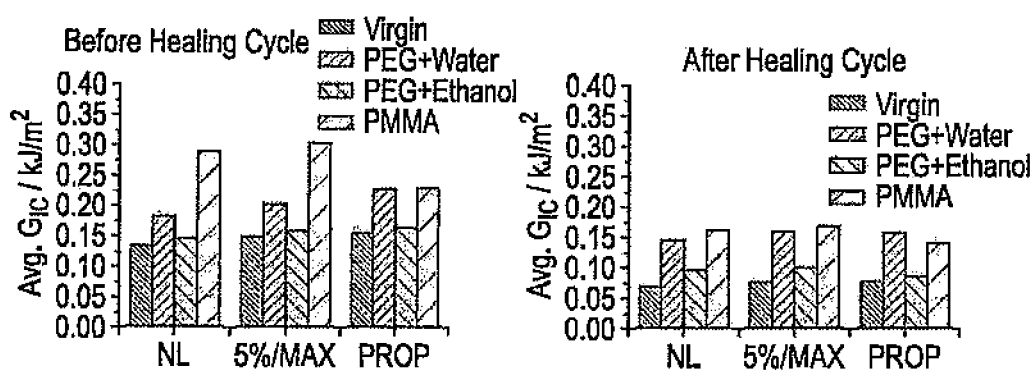
Figure 17:
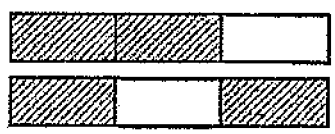
Figure 18:
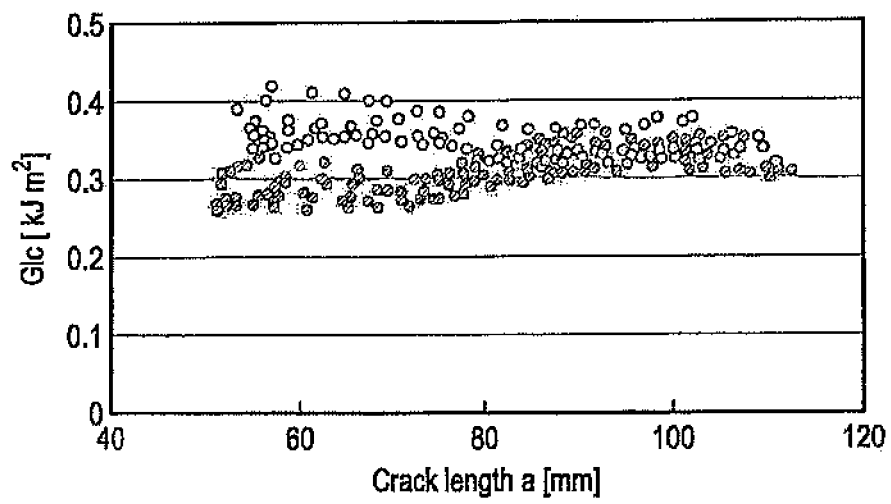
Figure 19:
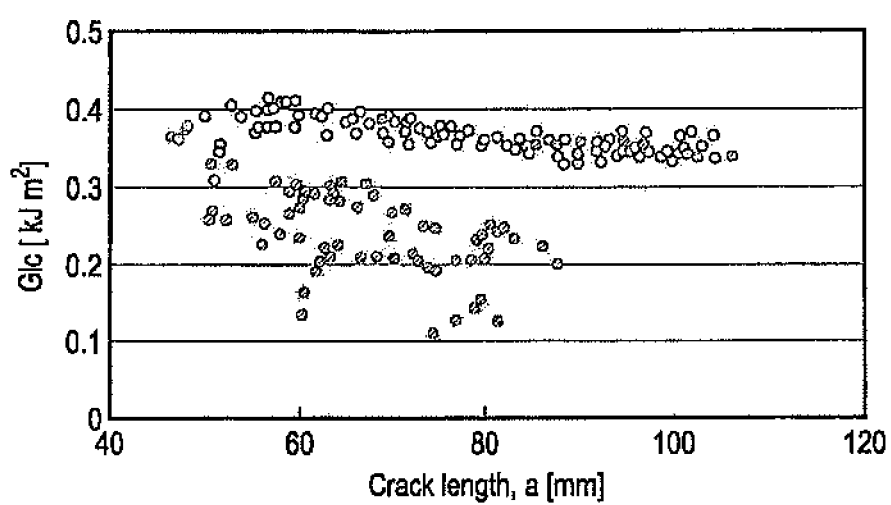
Figure 20:
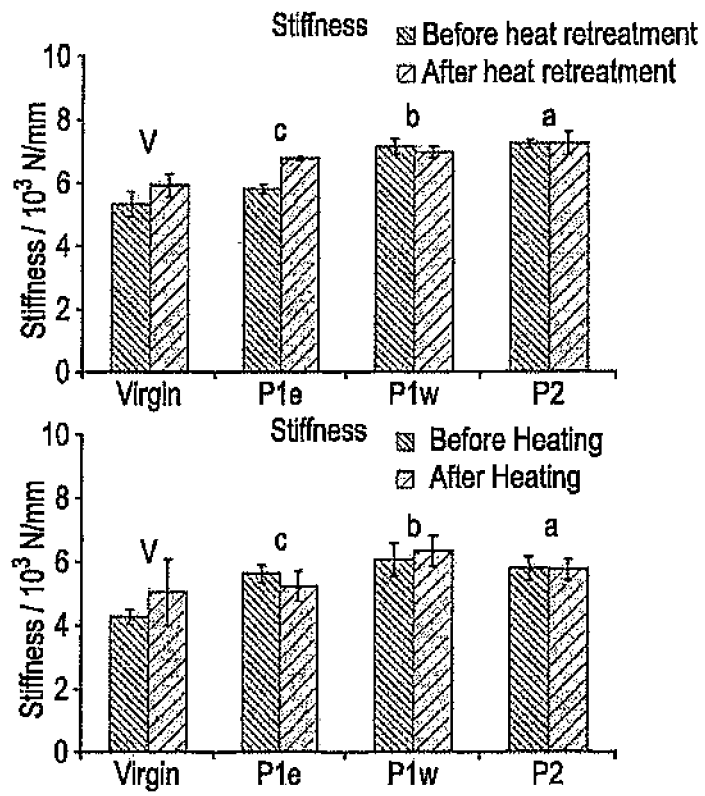
Figure 21:
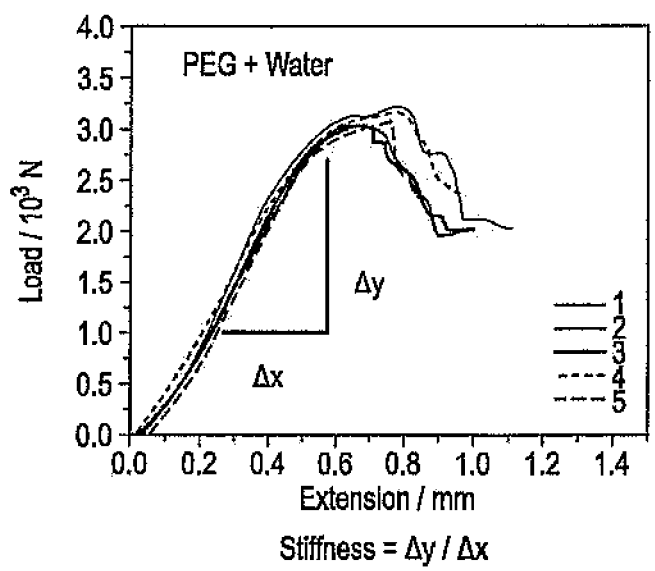
Figure 22:
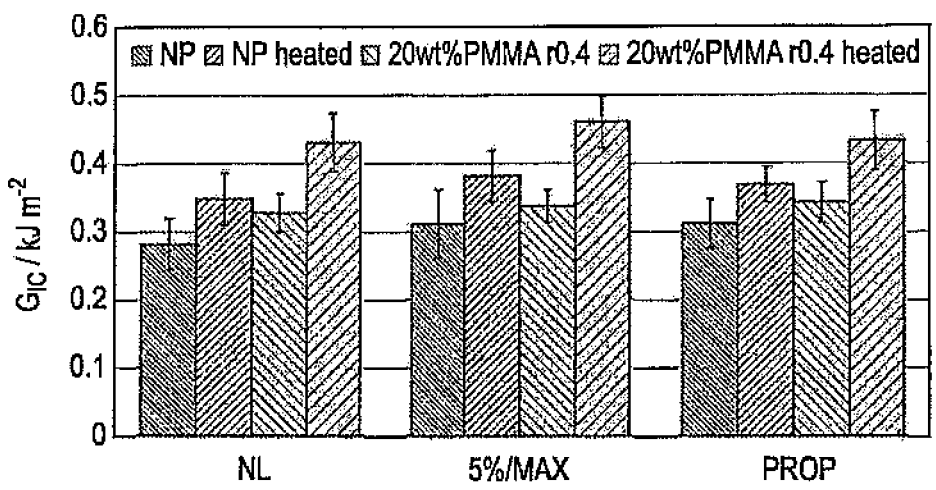
Figure 23:
Figure 24A:
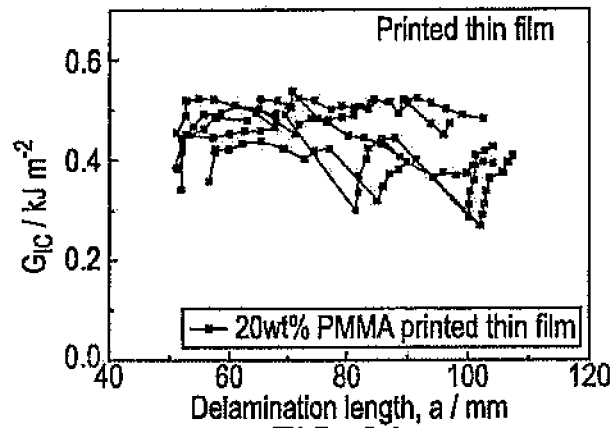
Figure 24B:
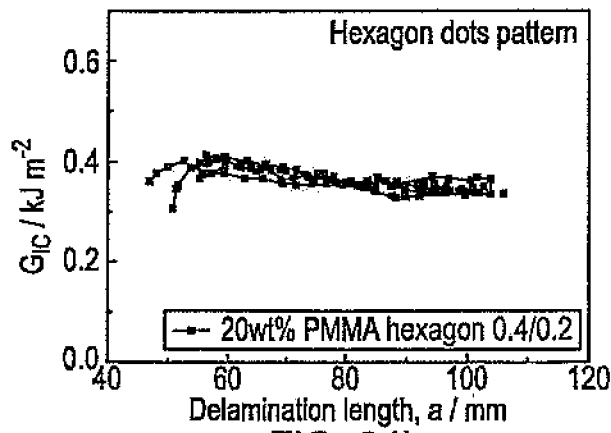
Figure 24C:
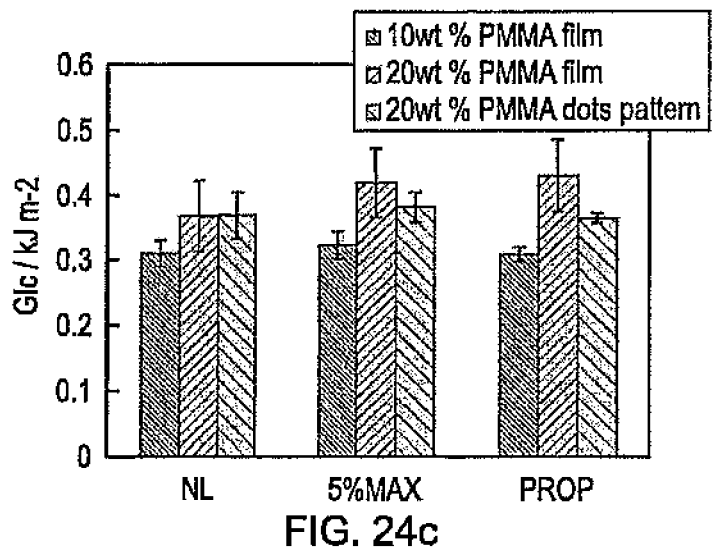

FIG. 13 is a graph related to Example 8;
FIG. 14 is a graph related to Example 9;
FIG. 15 is a graph related to Example 10;
FIG. 16 is a series of graphs related to further results
FIG. 17 is a schematic representation of a part made according to the invention;
FIG. 18 is a graph associated with testing the part of FIG. 17;
FIG. 19 is a graph showing the effect of increasing polymer concentration;
FIGS. 20 and 21 are a series of graphs showing the stiffness of virgin and test composites before and after heating respectively.
FIG. 22 shows graphs related to Example 14.
FIG. 23 shows SBS tested samples as explained in Example 15.
FIG. 24 (a-c) show graphs related to Example 16.

In a first set of experiments we investigated the application of various thermoplastic polymers onto a carbon fibre epoxy prepreg.

EXAMPLES 1 TO 3

In a first set of experiments we dissolved thermoplastics materials, in various solvents, in the amounts set out in Table 1 below:

TABLE 1

Parameters of thermoplastic solution and print characteristics

| Example | Composition of 'ink' | | | Diameter of printhead/μm | Pattern |
|---|---|---|---|---|---|
| | Solute | wt % | Solvent | | |
| 1 | PMMA | 5 | DMF* | 60 | Hexagon |
| 2 | PEG | 5 | Distilled water | 60 | Hexagon |
| 3 | PEG | 5 | Pure Ethanol | 60 | Hexagon |

Where: $Mn_{(PMMA)}$ = 15,000; $Mn_{(PEG)}$ = 20,000; DMF is N,N-Dimethylformamide; Pattern is the shape described by the array of dots, The ink jet printer used was a Jetlab 4XL (supplied by MicroFab) and operated in each case according to the parameters as set out in Table 2.

TABLE 2

Parameters for operation of ink jet printer

| Example | Jet |
|---|---|
| 1 | RT |
| 2 | RT |
| 3 | Polymer |

Where: RT is room temperature and Polymer is Polymer Jet PrintHead, which can be heated to temperatures as high as 240° C.

In each case the Rise Time, Dwell Time and Dwell Voltage may be altered to ensure that stable droplets are generated.

The various polymer solutions were each printed or deposited onto a carbon fibre enforced epoxy prepreg, designated as Cycom977-2 (supplied by Cytec Engineered Materials of Wrexham, UK) as a substrate.

In each case the as printed substrates were cured according to the following cure regime:
① (Ramp: 20° C.→100° C. (rate: 2° C./min)
② Dwell: 30 min
③ Ramp: 100° C.→177° C. (rate: 2° C./min)
④ Dwell: 120 min
⑤ Ramp: 177° C.→20° C. (rate: 2° C./min)

In order to investigate the behaviour of the islands of thermoplastics due to exposure to elevated temperatures of the curing cycle a series of microscopy studies was undertaken:

EXAMPLE 1A

Figure 1:
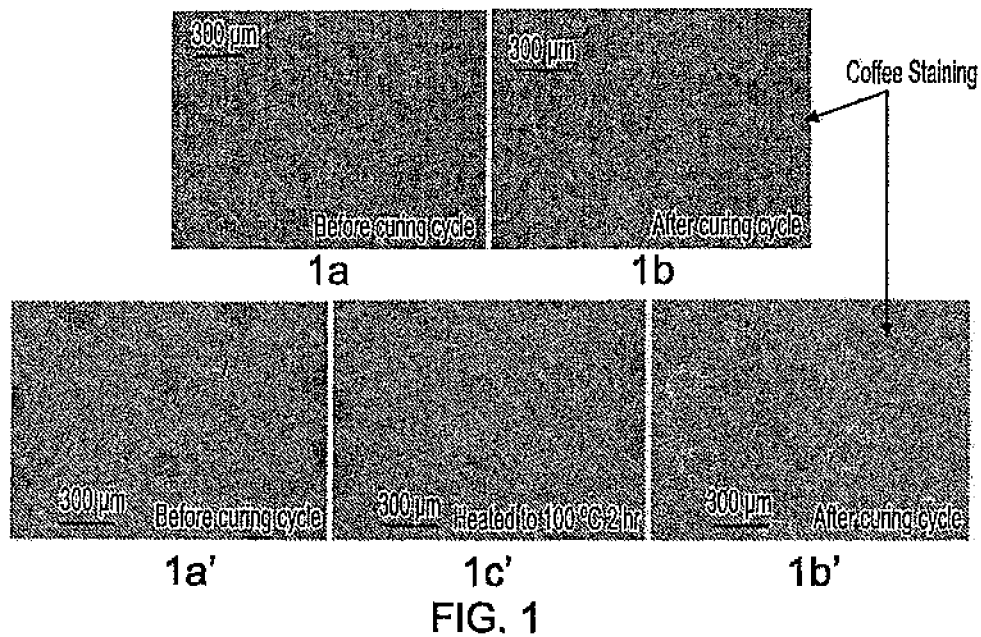
FIG. 1 is a series of optical microscopy slides related to Example 1A.

Referring to FIG. 1, a series of PMMA islands were applied to a glass slide. The PMMA was doped with fluorescein to enhance optical microscopy and images were taken with an optical microscope (CK40-SLP, Olympus).

FIG. 1a shows islands prior to heating and FIG. 1b shows the same islands after exposure to the curing cycle. FIGS. 1a' and 1b' are images of the same solutions deposited in a hexagonal array. FIG. 1c shows the spots after being exposed to an elevated temperature for 2 hours.

The results show that the islands reduce in volume (due to solvent evaporation), and demonstrate some 'coffee staining' as a result of evaporation of the solvent, but they remain in place and are not subject to translational motion.

EXAMPLE 1B

Figure 2:
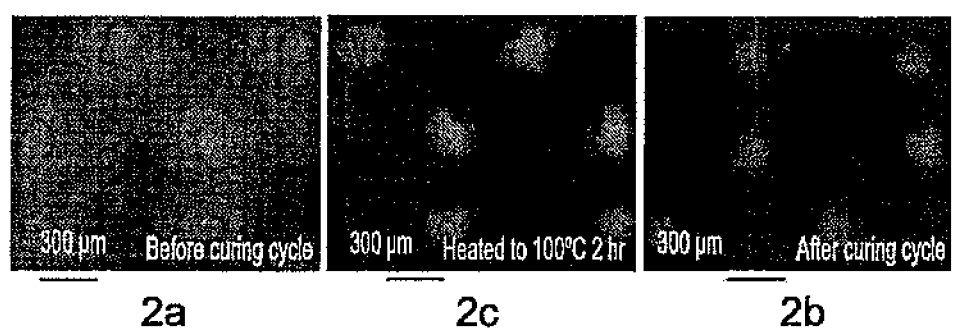
FIG. 2 is a series of optical microscopy slides related to Example 1B.

Referring to FIG. 2 a series of PMMA islands were applied to a glass slide. The PMMA was doped with fluorescein to enhance optical microscopy and fluorescein images were taken with an optical microscope (Image Xpress).

FIG. 2a is before curing, FIG. 2b is after curing and FIG. 2c is after being heated to 100° C. for 2 hours.

The results clearly show that the dots stay as distinct islands.

EXAMPLE 1C

Figure 3:
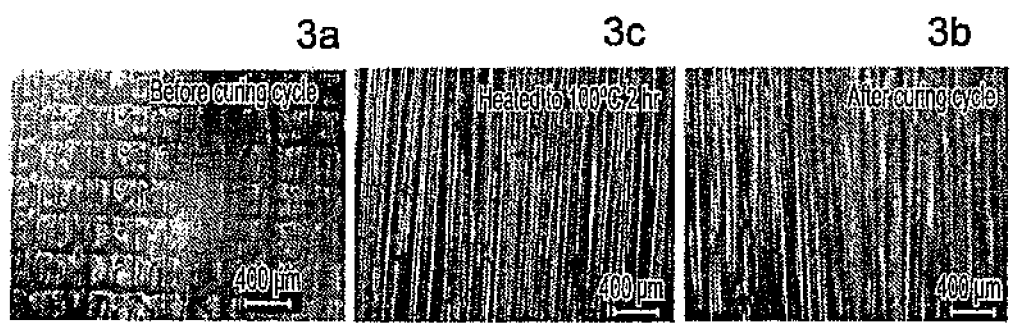
FIG. 3 is a series of optical microscopy slides related to Example 1C.

Referring to FIG. 3 a series of PMMA dots were applied to Cycom977-2. Images were taken with an optical microscope (Polyvar).

FIG. 3a is before curing, FIG. 3b is after curing and FIG. 3c is after being heated to 100° C. for 2 hours.

In this case there is no visible evidence of the thermoplastic islands on the surface after exposure to heat, however, we believe that the thermoplastic remains, as evidenced in the previous images.

EXAMPLE 1D

Figure 4:
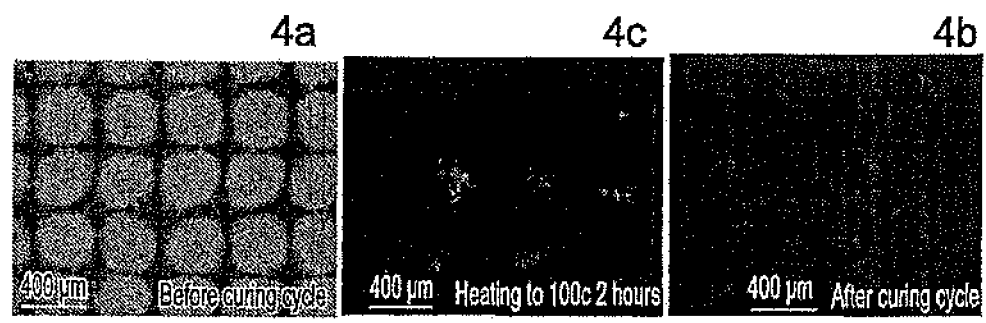
FIG. 4 is a series of optical microscopy slides related to Example 1D.

Referring to FIG. 4 a series of fluorescein-doped PMMA dots were applied to Cycom977-2. Fluoroscein images were taken with an optical microscope (Image Xpress).

FIG. 4a is before curing, FIG. 4b is after curing and FIG. 4c is after being heated to 100° C. for 2 hours.

In this case it appears that the fluorescein within the islands sprayed out after heating and with increased temperature (there is some evidence of fluorescein in FIG. 4c).

In order to investigate this behaviour a series of interferometry experiments were undertaken.

EXAMPLE 1E

Figure 5:
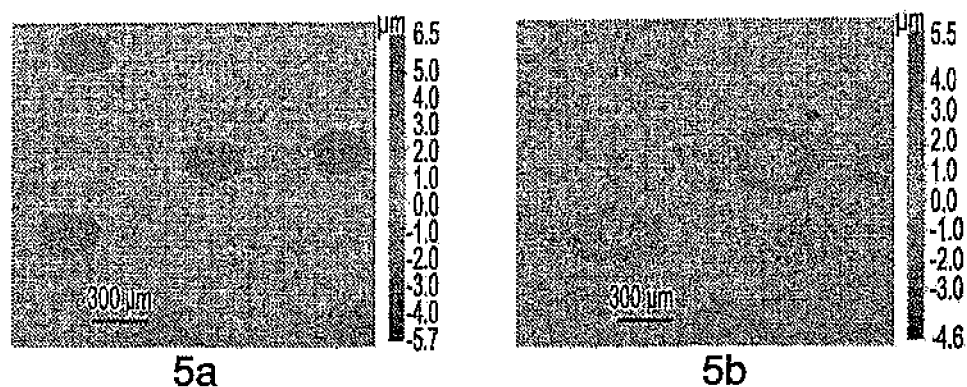
FIG. 5 is a series of optical microscopy slides related to Example 1E.

Using a 3D optical microscope (Contour GT supplied by Bruker) interferometry images were taken of PMMA dots applied to a glass slide, before during (FIG. 5a) and after curing (FIG. 5b).

The images show that the islands remain in place.

EXAMPLE 1F

Figure 6:
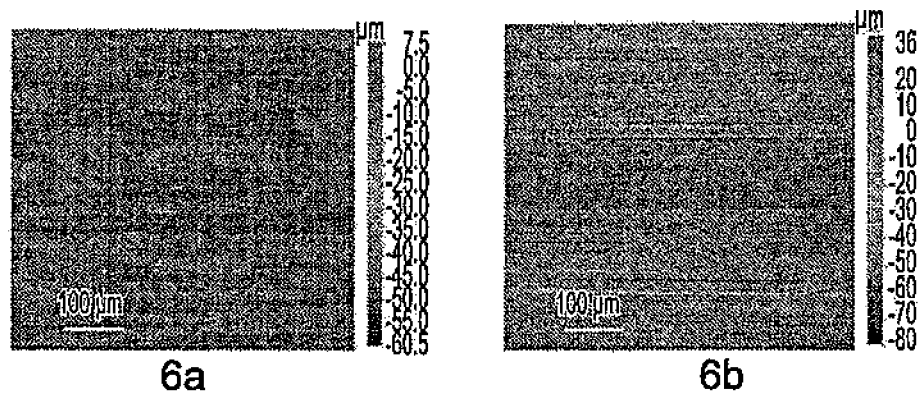
FIG. 6 is a series of optical microscopy slides related to Example 1F.

Using a 3D optical microscope (Contour GT supplied by Bruker) interferometry images were taken of PMMA dots applied to Cycom977-2, before curing (FIG. 6a) and after curing (FIG. 6b).

The results show that islands are evident before curing but not after curing.

Whilst not wishing or intending to be bound by any particular theory, we believe that the islands have either splayed out or have penetrated into the surface of the prepreg. However, we believe that there are local peak concentrations of thermoplastics islands at or towards the surface.

EXAMPLE 2A

Figure 7:
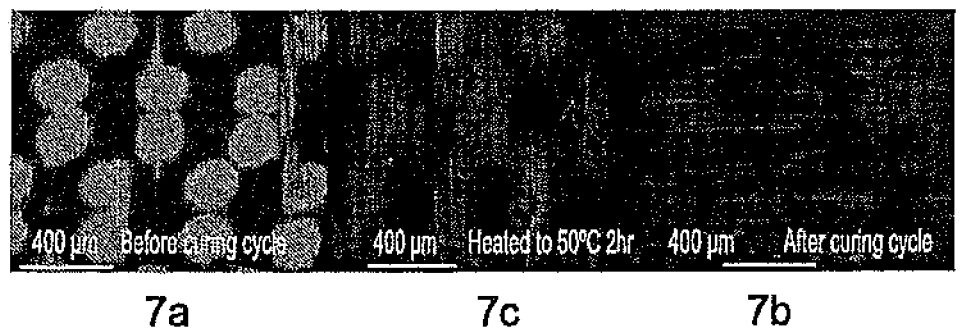
FIG. 7 is a series of optical microscopy slides related to Example 2A.

Referring to FIG. 7 a series of fluorescein-doped PEG dots were applied to Cycom977-2. Fluoroscein images were taken with an optical microscope (Image Xpress).

FIG. 7a is before curing, FIG. 7b is after curing and FIG. 7c is after being heated to 100° C. for 2 hours.

In this case it appears that the fluorescein within the islands sprayed out after heating and with increased temperature (there is some evidence of fluorescein in FIG. 7c).

A series of further experiments were undertaken to determine the physical performance of the composites made according to the invention.

EXAMPLES 3 TO 6—INTERLAMINAR SHEAR STRENGTH

In each case a composite test piece was made either using eight prepreg layers (designated virgin), or with eight prepreg layers and the solutions set out in Table 1.

Determination of apparent interlaminar shear strength by short-beam method (SBS) according to BS EN ISO 14130: 1998.

Calculation of interlaminar shear stress; $\tau=3F/4bh$ & $\tau_M=3F_M/4bh$

Where: F is the load, $F_M$ is the maximum load;
b is the width of the test specimen; b=10.0 mm
h is the thickness of the test specimen; h=2.0 mm.

EXAMPLE 3

Figure 8:
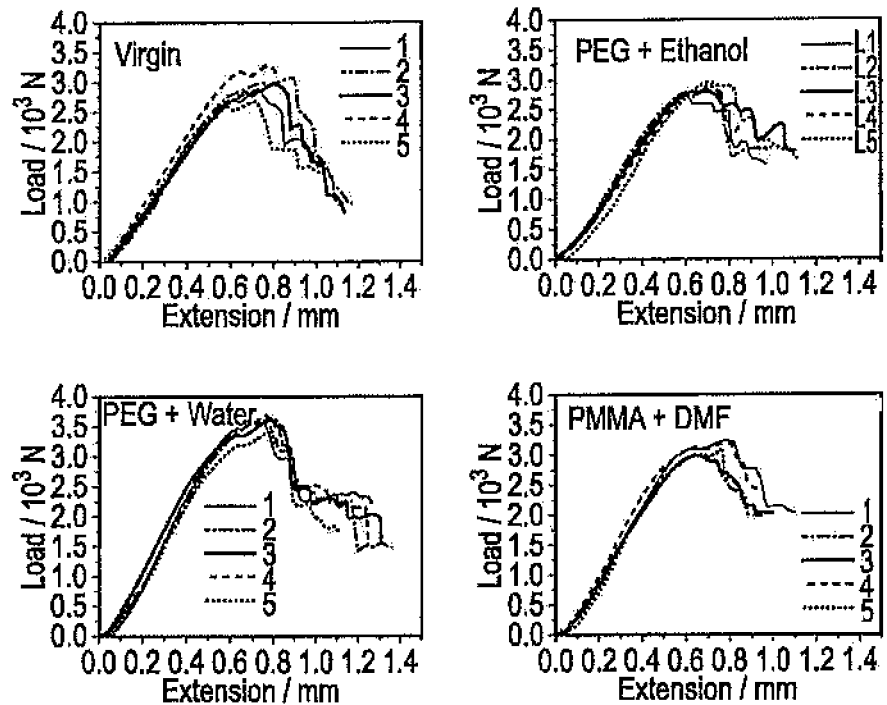
FIG. 8 is a series of graphs related to Example 3

The results for repeat interlaminar sheer strength tests (5 runs each) are shown in FIG. 8 for a series of experiments conducted on test pieces which are as cured.

The results are as shown in Table 3:

TABLE 3

| | Results | | | | | |
|---|---|---|---|---|---|---|
| | Slope ($\times 10^3$ N/mm) | | Maximum Load ($\times 10^3$ N) | | $\tau_M$ (MPa) | |
| | Avg. | SD | Avg. | SD | Avg. | SD |
| Virgin | 5.340 | 0.355 | 2.985 | 0.228 | 111.9 | 8.5 |
| 5% PEG + Ethanol | 5.781 | 0.177 | 2.817 | 0.107 | 105.6 | 4.3 |
| 5% PEG + Water | 7.093 | 0.239 | 3.590 | 0.105 | 134.6 | 3.9 |
| 5% PMMA + DMF | 7.147 | 0.082 | 3.118 | 0.081 | 116.9 | 3.0 |

* SD: standard deviation

It can be seen that samples with printed self-healing agent have higher stiffness which is represented by slope of straight part of load versus extension curves than that of virgin samples. And with printed PMMA, samples have the highest stiffness. Moreover, there is no significant difference among virgin and self-healing agent printed samples regarding to average maximum load and average maximum interlaminar shear stress, showing no reduction in the structural integrity of the system due to the deposited self-healing agent. That said, there is a notable reduction in the standard deviation for 5% PMMA printed system. Although we neither wish nor intend to be bound by any particular theory, we believe this to be due to a better damage control by arresting crack propagation through PMMA islands, whilst maintaining the adhesion between the prepreg plies, and hence an increased engineering predictability in the optimised system.

EXAMPLE 4

Figure 9:
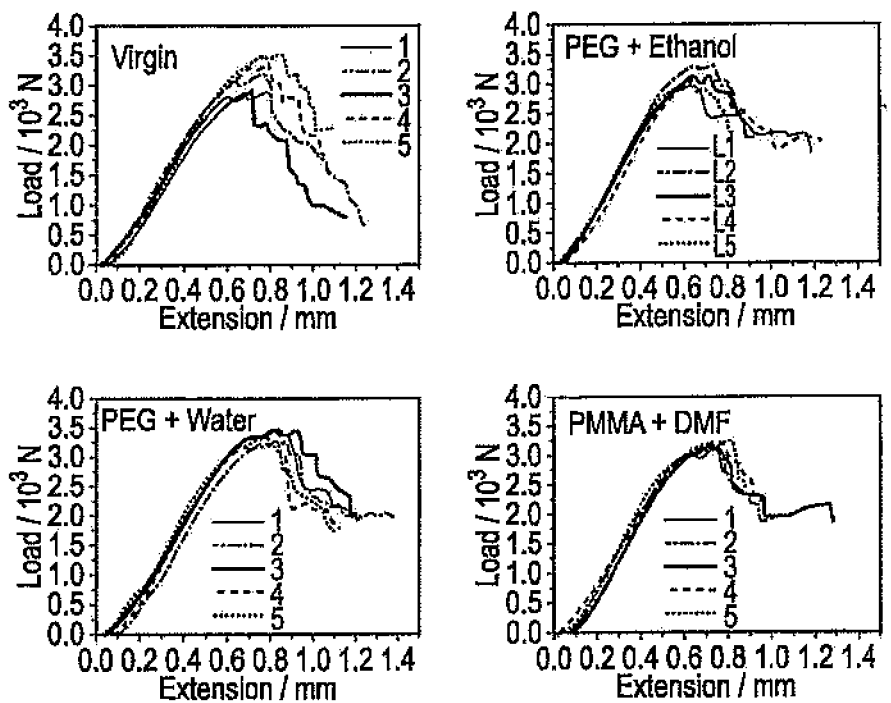
FIG. 9 is a series of graphs related to Example 4.

The results for repeat interlaminar sheer strength tests (5 runs each) are shown in FIG. 9 for a series of experiments conducted on test pieces which are as cured and subsequently 'healed' by exposing to the cure regime as set out above.

The results are as shown in Table 4:

TABLE 4

| | Results | | | | | |
|---|---|---|---|---|---|---|
| | Slope ($\times 10^3$ N/mm) | | Maximum Load ($\times 10^3$ N) | | $\tau_M$ (MPa) | |
| | Avg. | SD | Avg. | SD | Avg. | SD |
| Virgin | 5.900 | 0.368 | 3.170 | 0.269 | 118.9 | 10.1 |
| 5% PEG + Ethanol | 6.780 | 0.044 | 3.088 | 0.128 | 115.8 | 4.8 |
| 5% PEG + Water | 6.906 | 0.145 | 3.363 | 0.088 | 126.1 | 3.3 |
| 5% PMMA + DMF | 7.205 | 0.406 | 3.177 | 0.066 | 119.1 | 2.5 |

It can be seen that samples with printed self-healing agent have higher stiffness than that of virgin samples. And With printed PMMA, samples have highest stiffness. Moreover, there is no significant difference between virgin samples and self-healing agent printed samples regarding to average maximum load and average maximum interlaminar shear stress values, showing no reduction in the structural integrity of the system due to the deposited self-healing agent.

Comparing the results from Examples 3 and 4, it can be seen that the average maximum interlaminar shear stress ($\tau_M$), average maximum load and average stiffness of almost four groups are slightly enhanced after the healing cycle, it could be either caused by the printed self-healing agent or by the post curing of epoxy in pre-preg itself or both.

EXAMPLE 5

Figure 10:
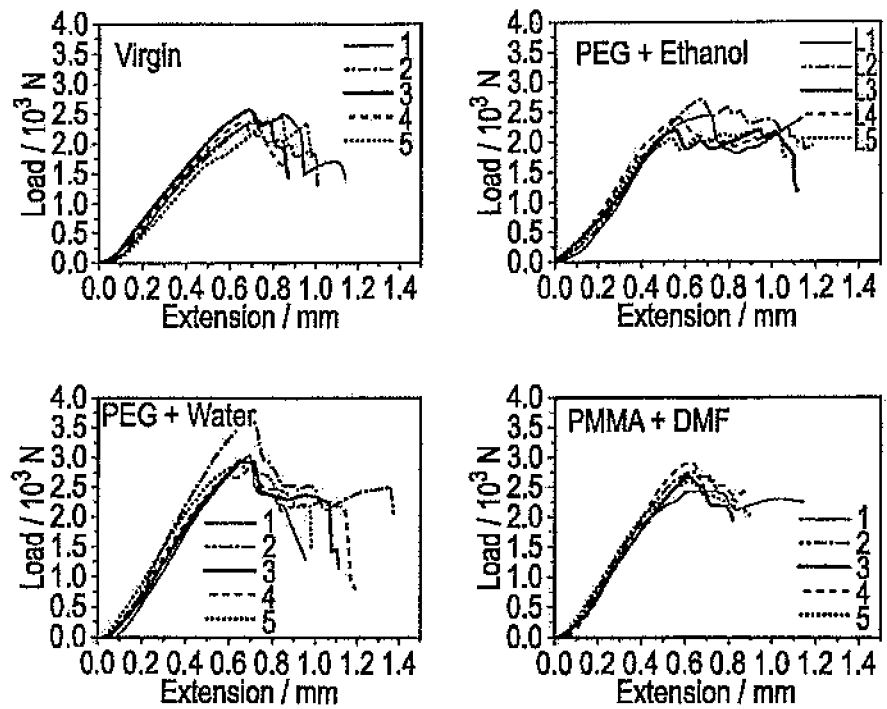
FIG. 10 is a series of graphs related to Example 5.

The results for repeat interlaminar sheer strength tests (5 runs each) are shown in FIG. 10 for a series of experiments conducted on test pieces which are as cured and subsequently 'damaged' by exposing the test piece to a tensometer and stopping loading just after the maximum load displaced is seen on the monitor.

The results are as shown in Table 5:

TABLE 5

| | Results | | | | | |
|---|---|---|---|---|---|---|
| | Slope ($\times 10^3$ N/mm) | | Maximum Load ($\times 10^3$ N) | | $\tau_M$ (MPa) | |
| | Avg. | SD | Avg. | SD | Avg. | SD |
| Virgin | 4.268 | 0.172 | 2.463 | 0.079 | 92.4 | 3.0 |
| 5% PEG + Ethanol | 5.620 | 0.283 | 2.376 | 0.235 | 89.1 | 8.8 |
| 5% PEG + Water | 6.061 | 0.537 | 3.054 | 0.318 | 114.6 | 11.9 |
| 5% PMMA + DMF | 5.770 | 0.393 | 2.593 | 0.073 | 97.3 | 2.7 |

We can see (by comparing the results from Example 3 and those in Table 5) that the mechanical properties of four groups are reduced after damage, as expected. Samples with printed self-healing agent are stiffener than the virgin ones. Moreover, no significant difference is observed regarding to average maximum load and average maximum interlaminar shear stress among four groups, showing no reduction in the structural integrity of the system due to the deposited self-healing agent. Since the damage process cannot guarantee introducing the same amount of damage to every test specimen, the results of some groups have a variation which does not obey the common rules.

EXAMPLE 6

Figure 11:
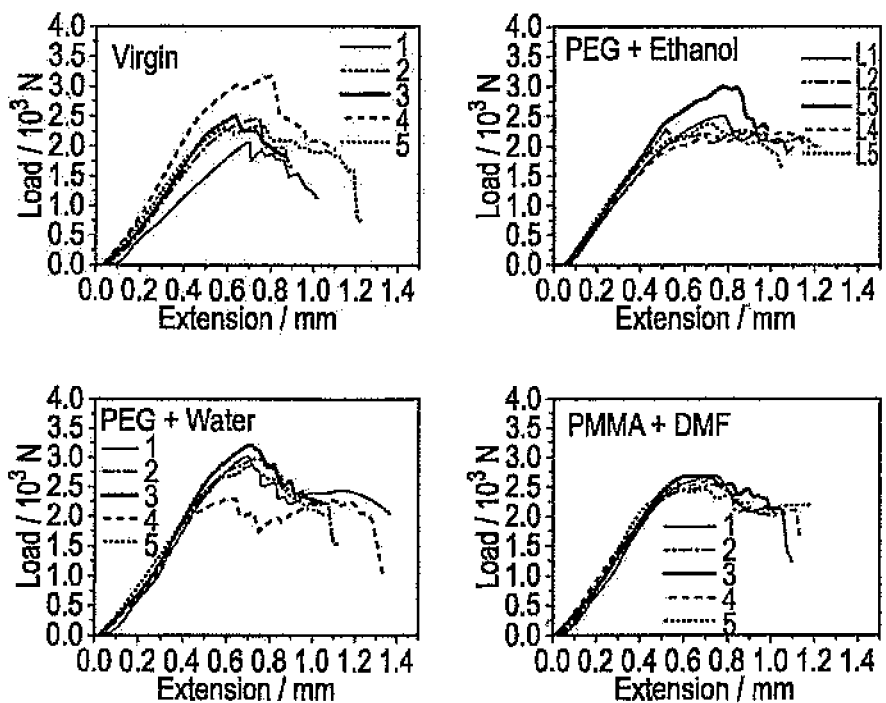
FIG. 11 is a series of graphs related to Example 6.

The results for repeat interlaminar sheer strength tests (5 runs each) are shown in FIG. 11 for a series of experiments conducted on test pieces which are as cured and subsequently 'damaged' by exposing the test piece to a tensometer and stopping loading just after the maximum load displaced is seen on the monitor and subsequently 'healed' by exposing to the cure regime as set out above.

The results are set out in Table 6.

TABLE 6

| | Results | | | | | |
|---|---|---|---|---|---|---|
| | Slope ($\times 10^3$ N/mm) | | Maximum Load ($\times 10^3$ N) | | $\tau_M$ (MPa) | |
| | Avg. | SD | Avg. | SD | Avg. | SD |
| Virgin | 5.046 | 1.011 | 2.520 | 0.406 | 94.5 | 15.2 |
| 5% PEG + Ethanol | 5.224 | 0.464 | 2.486 | 0.300 | 93.2 | 11.3 |
| 5% PEG + Water | 6.334 | 0.502 | 2.881 | 0.339 | 108.1 | 12.7 |
| 5% PMMA + DMF | 5.756 | 0.316 | 2.674 | 0.174 | 100.3 | 6.5 |

It can be seen that samples with printed self-healing agent are slightly stiffener than virgins. And comparing the results of Table 6 with those of Table 5, almost every parameter of each group has a slight enhancement, except $\tau_M$ of 5% PEG+Water group which, we believe may well be a variation of experiment process. Because the damage process cannot guarantee all damaged samples were introduced the same amount of damage, that means the results of Table 6 samples in have higher damage level than the samples set out in Table 5, the values of all parameters of the Example 6 should lower than that of Example 5, in which case, we will not be able to see the self-healing efficiency if the self-healing efficiency is not apparent enough.

The summary of the results is set out in Table 7 below:

TABLE 7

| | | | Results Summary of SBS tests | | | | | |
|---|---|---|---|---|---|---|---|---|
| | | | Average value n = 5 | | | | | |
| | Damage | Heal | Slope ($\times 10^3$ N/mm) | SD* | Load$_{MAX}$ ($\times 10^3$ N) | SD* | $\tau_M$ (MPa) | SD* |
| Virgin | x | x | 5.340 | 0.355 | 2.985 | 0.228 | 111.9 | 8.5 |
| | x | ✓ | 5.900 | 0.368 | 3.170 | 0.269 | 118.9 | 10.1 |
| | ✓ | x | 4.268 | 0.172 | 2.463 | 0.079 | 92.4 | 3.0 |
| | ✓ | ✓ | 5.046 | 1.011 | 2.520 | 0.406 | 94.5 | 15.2 |
| 5% PEG + Water | x | x | 7.093 | 0.239 | 3.590 | 0.105 | 134.6 | 3.9 |
| | x | ✓ | 6.906 | 0.145 | 3.363 | 0.088 | 126.1 | 3.3 |
| | ✓ | x | 6.061 | 0.537 | 3.054 | 0.318 | 114.6 | 11.9 |
| | ✓ | ✓ | 6.334 | 0.502 | 2.881 | 0.339 | 108.1 | 12.7 |
| 5% PEG + Ethanol | x | x | 5.781 | 0.177 | 2.817 | 0.107 | 105.6 | 4.3 |
| | x | ✓ | 6.780 | 0.044 | 3.088 | 0.127 | 115.8 | 4.8 |
| | ✓ | x | 5.620 | 0.283 | 2.376 | 0.235 | 89.1 | 8.8 |
| | ✓ | ✓ | 5.224 | 0.464 | 2.486 | 0.300 | 93.2 | 11.3 |
| 5% PMMA + DMF | x | x | 7.147 | 0.082 | 3.118 | 0.081 | 116.9 | 3.0 |
| | x | ✓ | 7.205 | 0.406 | 3.177 | 0.066 | 119.1 | 2.5 |
| | ✓ | x | 5.770 | 0.393 | 2.593 | 0.073 | 97.3 | 2.7 |
| | ✓ | ✓ | 5.756 | 0.316 | 2.674 | 0.174 | 100.3 | 6.5 |

From SBS test, it can be concluded as following:

a. Printed polymeric agent of only 0.02% weight addition can significantly increase the shear stiffness of the composite before and after damage in shear, where the composite is most vulnerable and such improvements can significantly improve the damage tolerance of the overall system.

b. Even though this experiment was conducted to evaluate structural soundness of the system alone, there is evidence of self-healing efficiency as a result of the damage process, showing no reduction in the structural integrity of the system due to the deposited self-healing agent.

EXAMPLES 7-10

A further series of experiments were undertaken to determine the mode I interlaminar fracture toughness, $G_{IC}$ for unidirectionally reinforced materials, according to BS ISO 15024:2001. Each test sample, whether a 'virgin' or test sample, comprised twelve layers' of prepreg material, the difference between 'virgin' and 'test' samples being the provision of thermoplastic polymer at the interface between successive layers in the 'test' samples.

Figure 25:
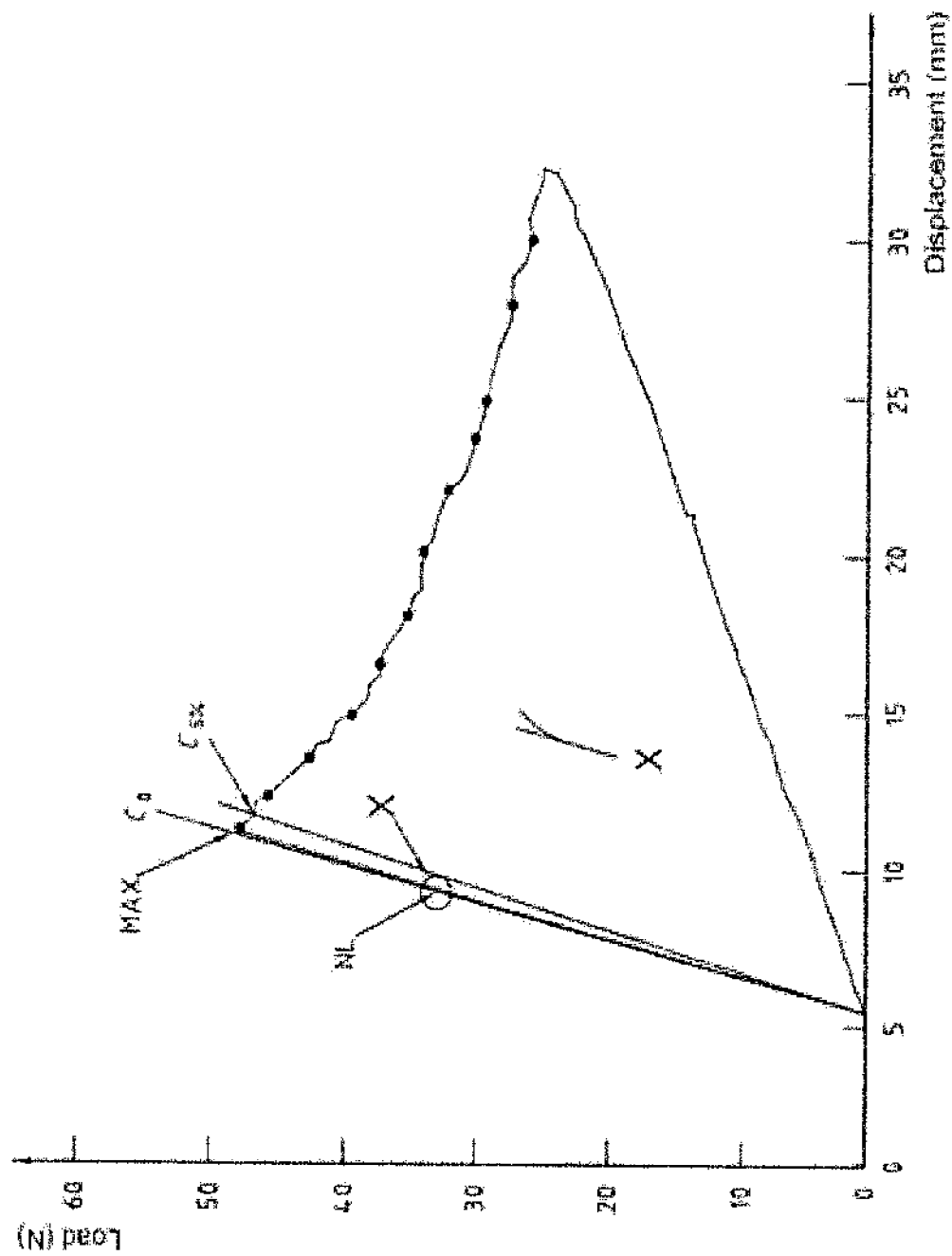

According to the standard, there are several important $G_{IC}$ values of particular points which are shown in FIG. 25. These points are defined as follows:
1) NL point—non linear point of deviation from linearity on the load versus extension trace
2) 5%/MAX point—the point which occurs first on the loading the specimen between:
    a) The point of 5% increase in compliance ($C_{5\%}$) from its initial value ($C_0$);
    b) The maximum load point.
3) PROP points—propagation value of fracture toughness, consisting of points of discrete delamination length increments beyond the tip of the insert or starter crack tip marked on the load-extension trace, points where the crack has been arrested being excluded The important points are shown graphically in FIG. 25, which is a load-displacement curve for a DCB test showing initiation from the resulting mode I precrack followed by crack propagation and unloading.

COMPARATIVE EXAMPLE 7

In order to determine a base line, 'virgin' samples were tested. The tested samples were then subjected to the 'heal' procedure and tested again to determine if any self-heeling occurred.

Figure 12:
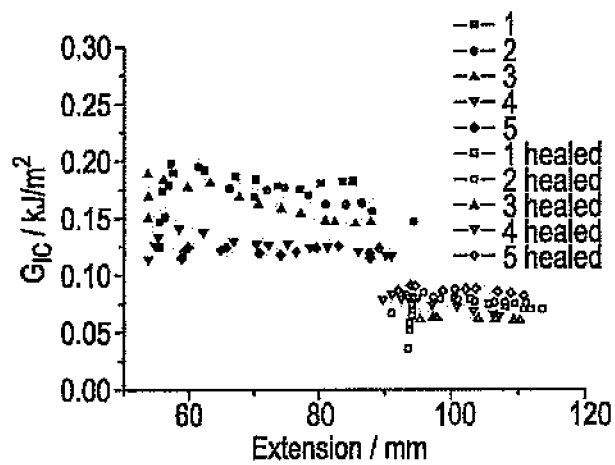
FIG. 12 is a graph related to Comparative Example 7.

The results are shown in FIG. 12 and set out below in Table 8:

TABLE 8

Results for Comparative Example 7

| | $G_{IC}$ (kJ/m$^2$) Before healing cycle | | | $G_{IC}$ (kJ/m$^2$) After healing cycle | | |
|---|---|---|---|---|---|---|
| | NL point | 5%/MAX point | Avg. PROP points | NL point | 5%/MAX point | Avg. PROP points |
| 1 | 0.12473 | 0.14723 | 0.1825 | 0.03625 | 0.05311 | 0.07353 |
| 2 | 0.15226 | 0.17972 | 0.17082 | 0.06807 | 0.08122 | 0.07775 |
| 3 | 0.12558 | 0.12749 | 0.12761 | 0.06182 | 0.06327 | 0.062 |
| 4 | 0.15013 | 0.16851 | 0.16379 | 0.07914 | 0.08282 | 0.07273 |
| 5 | 0.11611 | 0.12309 | 0.12177 | 0.0873 | 0.09164 | 0.08688 |
| Average | 0.13376 | 0.14921 | 0.1533 | 0.06652 | 0.07441 | 0.07458 |
| SD | 0.01636 | 0.02481 | 0.02704 | 0.01957 | 0.01575 | 0.009 |

EXAMPLE 8

An experiment was conducted using a composite formed from Cycom977-2 and provided with dots applied in accordance with Example 2 (as set out in Table 1 and 2), i.e. 5% PEG in water. The samples were tested. The tested samples were then subjected to the 'heal' procedure and tested again to determine if any healing occurred.

The results are shown in FIG. 13 and set out in Table 9

TABLE 9

Results of Example 8

| | $G_{IC}$ (kJ/m$^2$) Before healing cycle | | | $G_{IC}$ (kJ/m$^2$) After healing cycle | | |
|---|---|---|---|---|---|---|
| | NL point | 5%/MAX point | Avg. PROP points | NL point | 5%/MAX point | Avg. PROP points |
| 1 | 0.21025 | 0.22645 | 0.25724 | — | — | — |
| 2 | 0.18471 | 0.19142 | 0.22501 | 0.1845 | 0.19109 | 0.19153 |
| 3 | 0.17013 | 0.19376 | 0.21784 | 0.13057 | 0.1328 | 0.13037 |
| 4 | 0.1546 | 0.17097 | 0.20639 | 0.11506 | 0.11948 | 0.12052 |
| 5 | 0.19575 | 0.2283 | 0.234 | 0.1435 | 0.18661 | 0.18015 |
| Average | 0.18226 | 0.20218 | 0.22798 | 0.14341 | 0.1575 | 0.15564 |
| SD* | 0.02307 | 0.02466 | 0.01913 | 0.02976 | 0.03666 | 0.03541 |

EXAMPLE 9

S An experiment was conducted using a composite formed from Cycom977-2 and provided with dots applied in accordance with Example 3 (as set out in Table 1 and 2), i.e. 5% PEG in ethanol.

The samples were tested. The tested samples were then subjected to the 'heal' procedure and tested again to determine if any healing occurred.

The results are shown in FIG. 14 and set out in Table 10

TABLE 10

| | Results of Example 9 | | | | | |
|---|---|---|---|---|---|---|
| | $G_{IC}$ (kJ/m$^2$) Before healing cycle | | | $G_{IC}$ (kJ/m$^2$) After healing cycle | | |
| | NL point | 5%/MAX point | Avg. PROP points | NL point | 5%/MAX point | Avg. PROP points |
| 1 | 0.14259 | 0.15983 | 0.17721 | 0.11871 | 0.12171 | 0.11021 |
| 2 | 0.18581 | 0.18884 | 0.19879 | 0.06709 | 0.06928 | 0.05951 |
| 3 | 0.11545 | 0.13142 | 0.13464 | 0.09012 | 0.09193 | 0.08407 |
| 4 | 0.12066 | 0.13389 | 0.13222 | 0.08993 | 0.09331 | 0.08488 |
| 5 | 0.16128 | 0.17188 | 0.17279 | 0.11456 | 0.11487 | 0.09212 |
| Average | 0.14516 | 0.15717 | 0.16313 | 0.09608 | 0.09822 | 0.08616 |
| | 0.02916 | 0.02465 | 0.02885 | 0.02102 | 0.0208 | 0.01824 |

EXAMPLE 10

An experiment was conducted using a composite formed from Cycom977-2 and provided with dots applied in accordance with Example 1 (as set out in Table 1 and 2), i.e. 5% PMMA in DMF.

The samples were tested. The tested samples were then subjected to the 'heal' procedure and tested again to determine if any healing occurred.

The results are shown in FIG. 15 and set out in Table 11

TABLE 11

| | Results for Example 10 | | | | | |
|---|---|---|---|---|---|---|
| | $G_{IC}$ (kJ/m$^2$) Before healing cycle | | | $G_{IC}$ (kJ/m$^2$) After healing cycle | | |
| | NL point | 5%/MAX point | Avg. PROP points | NL point | 5%/MAX point | Avg. PROP points |
| 1 | 0.32722 | 0.32753 | 0.24347 | 0.20649 | 0.21411 | 0.15388 |
| 2 | 0.23818 | 0.28664 | 0.25612 | 0.11919 | 0.12132 | 0.11574 |
| 3 | 0.36688 | 0.37538 | 0.27223 | 0.19209 | 0.19501 | 0.17671 |
| 4 | 0.25826 | 0.26611 | 0.19555 | 0.13601 | 0.15049 | 0.13204 |
| 5 | 0.25664 | 0.25858 | 0.18249 | 0.1542 | 0.1555 | 0.11857 |
| Average | 0.28944 | 0.30285 | 0.22997 | 0.1616 | 0.16729 | 0.13939 |
| SD* | 0.055 | 0.04859 | 0.03902 | 0.03692 | 0.03706 | 0.02574 |

Referring now to FIG. 16, we can see the average G values of NL, 5%/MAX and avg. PROP points of PMMA printed specimens are higher than virgin and PEG printed specimens both before and after healing cycles, which means the printed PMMA enhances the interlaminar fracture toughness of all specimens. Whilst the PEG+ethanol results are only marginally better than the virgin results there is a slight improvement for this system as well.

Advantageously, the use of ink jet printing allows for easy application of the thermoplastic materials. Moreover, using direct application techniques (or indeed removal techniques) it is possible to introduce functionally graded improvements in fracture toughness, i.e. to have a resistance to fracture which changes across the width, or length of a part. FIG. 17 provides a schematic of two proposed parts with different regions bearing the thermoplastic polymer.

EXAMPLE 11

The results, shown in FIG. 18, show results for crack resistance in a part in which regions that were partly virgin and partly printed with polymer patterns. The graph shows how $G_{IC}$ swaps over and increases once the fracture reaches the patterned region.

EXAMPLE 12

In FIG. 19, G is seen to improve as the printed polymer concentration is increased (in each dot). The fracture toughness of the system printed with 20% polymer concentration (upper line) is significantly higher compared to 10% system.

EXAMPLE 13

In a further set of experiments the stiffness of samples (before and after heating) were determined. The results are shown in FIGS. 20 and 21. The samples were virgin (v), as Example 1 (a), as Example 2 (b) and as Example 3 (c).

It was demonstrated that samples containing the printed thermoplastic polymer have up to a 33.8% increase in stiffness compared to the virgin samples.

EXAMPLE 14

In a further set of experiments Cycom977-2 was printed with higher concentration of polymer (20% PMMA in DMF) in dots applied in accordance with Example 10.

The samples were tested. The tested samples were then subjected to the 'heal' procedure at slightly lower temperature of 160° C. for 40 minutes to avoid the reduction in toughness seen in the previous data due to the secondary cross-linking that occurs at 177° C., and tested again to determine if any healing occurred.

The results are shown in FIG. 22. The graphs show non-printed control samples (NP) and samples printed with an array of dots comprising 20 wt/wt % of PMMA. The fracture toughness was significantly increased both before and after self-healing treatment (i.e. heating to 160° C. for 40 mins), and the standard deviation was significantly reduced for the system with 20% concentration PMMA printed patterns.

EXAMPLE 15

Synchrotron X-ray computed tomography was carried out on the samples at Joint Engineering, Environmental and Processing (JEEP) beam line at Diamond Light Source. 1800 projections were recorded with the exposure time of 0.1 second over a 180-degree rotation; the beam energy was 53 keV. The distance between the sample and the detector was short therefore no phase contrast was observable. The detector was 2560×1373 pixels with a resolution of 3.24 µm per voxel. The width of the specimens were bigger than the field of view and region of interest tomography was performed which due to low attenuation of carbon did not require a ROI correction during reconstruction. A back projection code with limited ring-artifact suppression was used to reconstruct the data.

The evidence of self-healing is presented in FIG. 23, showing the SBS tested samples before (left) and after (right) thermal treatment with the layers being fused in the self-healed sample.

EXAMPLE 16

A fracture toughness test was carried out to evaluate the difference-between interleaf (film) area between the piles, commonly used to increase the toughness in composites at the expense of other mechanical properties due to the loss of adhesion between the plies, and the here presented printed patterns which allow epoxy surfaces in CFRP to remain in contact. The systems are presented in FIG. 24 (a-c), as a) 20% concentration film between the plies, b) 20% printed dots in hexagonal patterns (equivalent to 10% film deposited volume fraction of PMMA) and c) summary of the results for three systems, showing a notable increase in fracture toughness for 20% PMMA printed dots in CFRP compared to 10% printed full area or film in the same system.

As the amount (%) of PMMA is increased in film printed samples, the standard deviation is also increased, whereas the standard deviation is decreased for 20% PMMA dots due to a better crack arrest and higher degree of engineering predictability. 20% film pattern is only shown for the standard deviation purposes, considering that it would require close to 50% concentration of PMMA in hexagonal patterns to provide a comparative result for the discrete system, which is difficult to achieve using the existing inject printing system. The 20% film composite would also significantly increase the weight.

These results demonstrated the improved $G_{IC}$ for patterned surfaces and reduced standard deviation of the system at only 0.02% addition of discrete PMMA islands, compared to the film printed 'interleaf' method in the same system, if a comparable volume fraction of PMMA is used.

IN CONCLUSION

From the optical, fluorescein and interferometry images of PMMA (and other) dots on glass slides we can see the printed PMMA dots can stay as droplets after curing cycle. But from fluorescein and interferometry images of PMMA dots on pre-preg, we cannot see any dots after curing cycle, which means the printed PMMA is likely to react with epoxy and form localised bonds whilst fluorescein may depart due to the high temperature.

In the experiments set out above, in order to investigate the self-healing efficiency, a damage process has been employed to introduce an appropriate amount of damage into specimens for self-healing agency to heal. Double cantilever beam (DCB) and short beam shear (SBS) tests have been adopted to evaluate the self-healing efficiency, due to the damage occurring between the composite plies during the tests. Fluorescein was added to ink in order to investigate behaviours of the printed polymer dots before and after heating to different temperatures. From optical, fluorescein and interferometry images of PMMA dots on glass slides, it can be seen the printed PMMA dots stay as droplets after curing cycle. The fluorescein sprayed out after curing cycle both in PEG and PMMA cases, which can be spotted from fluorescein images of polymer dots on pre-preg. From interferometry images of PMMA dots on pre-preg, no dots are visible after curing cycle.

From the SBS test results, it is apparent to see that the printed self-healing agent can stiffen composite materials both before and after self-healing, and that printed PMMA samples have the highest stiffness among the four groups. Besides, we can see the values of slope, maximum load and r of samples after healing are higher slightly than that of before healing both in undamaged groups and damaged groups. This may be either because of the post curing of the epoxy in pre-preg or the printed self-healing agent but we prefer the latter explanation. Since the damage method cannot guarantee introducing the same amount of damages into samples, some results did not obey the common rules, which caused some variations.

From DCB test results, we can see almost all average values of initial (non-linear), 5% of the maximum load and average propagation values of fracture toughness with printed PMMA are higher than that of virgin and PEG printed specimens both before and after hearing cycle, which indicated that printing PMMA between composite plies significantly enhanced the interlaminar fracture toughness, both before and after the thermally treated damage (self-healing process).

It is clear that printed self-heeling agent can stiffen the composite, which can be concluded from SBS test results. Samples with printed PMMA have the highest stiffness among the four groups. However, no apparent self-healing efficiency has been observed among virgin samples and samples with self-healing agent through SBS test. It can be seen that specimens with printed PMMA have the highest mode I interlaminar fracture toughness ($G_{IC}$) both before and after healing cycles among the four groups, indicating a substantial recovery of the material after introduced damage, and a significant increase in fracture toughness of the system before the damage has been introduced. This also implies that the material is likely to sustain more load, due to its improved capacity to resist crack initiation and propagation.

Hence, the overall service life of the material will improve and also impart self-healing property, further extending its durability and lowering maintenance costs. This simultaneous increase in a number of thermo-mechanical properties both before and after damage, is achieved at less than 0.1% weight increase, rendering this as a unique system, capable of imparting properties into the original material that could not be achieved in any other way.

In respect of improving the self-healing properties, we believe, although we do not wish or intend to be bound by any particular theory, that increasing the molecular weight of the polymer will lead to improved self-healing. We also believe, and our experiments bear out, that increasing the amount of polymer will lead to increased robustness of the dots during cure and will lead to markedly improved self-healing properties. This, we believe, is due to increased viscosity of the polymer in the solution and/or islands of higher concentration.

The invention claimed is:

1. A method of fabricating a composite material, the method comprising the steps of
   a) providing a first layer of a fiber reinforced polymer;
   b) providing a thermoplastic material in the form of an array of thermoplastic dots across at least a portion of a major surface of the first layer;
   c) providing a second layer of a fiber reinforced polymer;
   d) laying the second layer over the array of thermoplastic dots on the portion of the major surface of the first layer on which the array of thermoplastic dots is provided; and
   e) securing the first and second layers together;
   wherein one portion of the thermoplastic dots consists essentially of poly(ethylene glycol) (PEG) and a remaining portion of the thermoplastic dots consists essentially of poly(methyl methacrylate) (PMMA); and
   wherein each of the thermoplastic dots in the array has an area of less than 1 mm$^2$ and the array of thermoplastic dots extends from 20-80% of the area of the first layer.

2. The method according to claim 1, wherein the first and second layers are secured together by applying at least one of heat and pressure.

3. The method according to claim 1, comprising providing as each of the first and second layers a prepreg.

4. The method according to claim 1, comprising applying the thermoplastic dots across the portion of the major surface of the first layer as a solution of thermoplastic in a solvent.

5. The method according to claim 1, comprising providing the thermoplastic dots by means selected from the group consisting of ink jet printing, contact printing, non-contact printing, and a mask and spray method.

6. The method according to claim 1, comprising repeating steps b) to e) to form successive layers of the composite material.

* * * * *